United States Patent
Jard et al.

(10) Patent No.: US 7,613,230 B2
(45) Date of Patent: Nov. 3, 2009

(54) METHOD OF PROCESSING A SIGNAL BY A RADIO RECEIVER AND RADIO RECEIVER FOR THE IMPLEMENTATION OF THE METHOD

(75) Inventors: Alexandre Jard, Suresnes (FR); Moussa Abdi, Paris (FR); Hassan El Nahas El Homsi, Paris (FR); Jean-Marc Corbel, Paris (FR)

(73) Assignee: Alcatel Lucent, Paris (FR)

( * ) Notice: Subject to any disclaimer, the term of this patent is extended or adjusted under 35 U.S.C. 154(b) by 740 days.

(21) Appl. No.: 10/807,664

(22) Filed: Mar. 24, 2004

(65) Prior Publication Data

US 2004/0240521 A1 Dec. 2, 2004

(30) Foreign Application Priority Data

Mar. 31, 2003 (FR) .................................. 03 03982

(51) Int. Cl.
*H04B 1/00* (2006.01)
(52) U.S. Cl. ..................................................... 375/148
(58) Field of Classification Search ................ 375/140, 375/147, 148, 150, 260, 285, 316, 347, 349; 455/133–135
See application file for complete search history.

(56) References Cited

U.S. PATENT DOCUMENTS

| | | | | |
|---|---|---|---|---|
| 6,430,166 B1* | 8/2002 | Bejjani et al. | ............... | 370/320 |
| 6,574,270 B1* | 6/2003 | Madkour et al. | ............ | 375/148 |
| 6,714,585 B1* | 3/2004 | Wang et al. | .................. | 375/148 |
| 6,801,565 B1* | 10/2004 | Bottomley et al. | .......... | 375/148 |
| 6,925,110 B2* | 8/2005 | Jard et al. | .................... | 375/152 |
| 7,372,894 B2* | 5/2008 | Rached et al. | .............. | 375/148 |
| 2002/0024992 A1* | 2/2002 | Ogawa et al. | ............... | 375/148 |
| 2002/0181628 A1* | 12/2002 | Iochi et al. | ................... | 375/347 |
| 2003/0043893 A1* | 3/2003 | Jard et al. | .................... | 375/152 |

FOREIGN PATENT DOCUMENTS

| | | |
|---|---|---|
| WO | WO 01/29982 | 4/2001 |
| WO | WO 01/29982 A1 * | 4/2001 |

OTHER PUBLICATIONS

John G. Proakis, Digital Communications, Third edition, 1995 Chapter 14.*
Bejjani E et al: Adaptive channel delays selection for WCDMA mobile system Vehicular Technology Conference, 1999. VTC 1999—Fall. IEEE VTS Amsterdam, Netherlands Sep. 19-22, 1999, Piscataway, NJ, USA, IEEE, US (Sep. 19, 1999), pp. 203-207, XP010352949 ISBN: 0-7803-5435-4 Sections I, II and III abstract.

(Continued)

*Primary Examiner*—Khanh C Tran
(74) *Attorney, Agent, or Firm*—Sughrue Mion, PLLC

(57) ABSTRACT

In a spread spectrum digital radio communication receiver, a propagation profile of a propagation channel between a sender and the receiver, including at least one propagation path associated with a reception energy, is determined, data relating to an energy distribution in the propagation profile are measured, and information symbols carried by a signal received originating from the sender over the propagation channel are estimated, by applying to the signal a processing taking into account a predetermined maximum number of propagation paths, the propagation paths taken into account being chosen according to a criterion selected from several criteria as a function of the measured data relating to the energy distribution in the propagation profile.

32 Claims, 2 Drawing Sheets

OTHER PUBLICATIONS

Yue L. "Analysis of Generalized Selection Combining Techniques" VTC 2000 IEEE 51ST. Vhicular Technology Conference Proceedings. Tokyo, Japan, May 15-18, 2000, IEEE Vehicular Technology Conference, New York, NY : IEEE, US, vol. 2 of 3. Conf. 51, May 15, 2000, pp. 1191-1195, XP000968058, ISBN: 0-7803-5719-1 GSC Algorithm 3 Section 3.

Cheun K: "Performance of Direct Sequence Spread Spectrum RAKE Receivers with Randon Spreading Sequences" IEEE Transactions on Communications, vol. 45, No. 9, (Sep. 1997), pp. 1130-1143, XP002258065 Sections I and II abstract.

John G. Proakis, "Digital Communications", third edition, 1995, chapter 14.

N. Kong et al. "A Selection Combining Scheme for Rake Receivers", 1995 Fourth IEEE International Conference on Universal Personal Communications, Nov. 6-10, 1995 pp. 426-430).

* cited by examiner

METHOD OF PROCESSING A SIGNAL BY A RADIO RECEIVER AND RADIO RECEIVER FOR THE IMPLEMENTATION OF THE METHOD

BACKGROUND OF THE INVENTION

The present invention relates to the processing of the signal in spread spectrum digital radio communication receivers.

The invention finds application in the field of code-division multiple access (CDMA) radio communications, such as UMTS ("Universal Mobile Telecommunication System").

In a CDMA system, the symbols transmitted, binary (±1) or quaternary (±1±j), are multiplied by spreading codes composed of samples, called "chips", whose rate (3.84 Mchip/s in the case of UMTS) is greater than that of the symbols transmitted. Orthogonal or quasi-orthogonal spreading codes are allotted to various logical channels sharing the same carrier frequency, so as to allow each receiver to detect the sequence of symbols which is destined therefor, by multiplying the signal received by the conjugate of the corresponding spreading code possibly shifted to compensate for the propagation times.

An advantage of the CDMA system is that it makes it possible to utilize radio propagation multipaths, by using what is referred to as a rake receiver.

The rake receiver performs coherent demodulation based on an approximation of the impulse response of the radio propagation channel by a series of spikes, each spike appearing with a delay corresponding to the propagation time along a particular path and having a complex amplitude corresponding to the attenuation and to the phase shift of the signal along this path (instantaneous realization of fading). By analyzing several reception paths, that is to say sampling, several times, the output from a filter matched to the spreading code of the channel, with delays corresponding respectively to these paths, the rake receiver obtains multiple estimates of the symbols transmitted, which are combined to obtain a diversity gain. Combining can be performed in particular according to the so-called MRC (Maximum Ratio Combining) method, which weights the various estimates as a function of the complex amplitudes observed for the various paths.

In order to allow this coherent demodulation, a pilot channel can be provided for the estimation of the impulse response in the form of a succession of spikes. The impulse response is estimated by means of a filter matched to a pilot spreading code with which the sender modulates a sequence of known symbols, for example symbols set to 1. The positions of the maxima of the output from this matched filter give the delays used in the fingers of the rake receiver, and the associated complex amplitudes correspond to the values of these maxima.

The rake receiver comprises a set of fingers making it possible to process one and the same sequence of information symbols that is received along different propagation paths from the sender. These paths are usually defined as delays with respect to a reference time.

In a representation of the CDMA signal received, which representation is utilized in a conventional rake receiver, this signal x(t) may be written:

$$x(t) = \sum_k \sum_i \sum_n A_i^k(t) \cdot b_{E[n/Q_k]}^k \cdot c_n^k p(t - nT - \tau_i^k) + \varepsilon(t) \quad (1)$$

where E[.] designates the integer part operator, k is an index of the CDMA channels superimposed on the relevant carrier, i is an index of the propagation paths existing between the sender or senders and the receiver, n is an index of the chips, p(.) designates the modulation shaping function ("pulse"), the vector ($b_{E[n/Qk]}^k$) is the symbol string shaped by the sender on channel k, $Q_k$ is the spreading factor of the k-th user, the vector ($c_n^k$) is the spreading code of channel k, $\tau_i^k$ is the propagation delay for path i and sender k, $A_i^k(t)$ is the complex amplitude along path i for user k at the instant t, and $\varepsilon(t)$ is additive noise.

The number of fingers of a rake receiver is generally limited. By way of example, a base station or a mobile terminal receiver using CDMA access technology typically possesses from 4 to 8 fingers per channel to be processed. This translates into a limitation in the number F of fingers of a rake receiver per user, which is frequently less than the number N of paths observed on the propagation profile existing between the sender or senders and the receiver for this user. The receiver is therefore required to select F paths from among the N paths observed, it being possible to do this according to various strategies. These selection strategies differ from one another in that each of them represents a compromise between complexity, and consequently consumption of the hardware and software resources in the receiver, and performance in terms of mean bit error probability after combination.

An optimal use of the resources of the rake receiver seeks the best selection of the paths available having regard to the number of fingers available to process them. An object of the present invention is to propose a mechanism which achieves a good compromise between the performance available according to various strategies for selecting paths and the computational cost engendered by the operations for processing the signal in the receiver.

SUMMARY OF THE INVENTION

The invention thus proposes a method of signal processing for a spread spectrum digital radio communication receiver, comprising the following steps:

determine a propagation profile of a propagation channel between sending means and the receiver, including at least one propagation path associated with a reception energy;

measure data relating to an energy distribution in the propagation profile;

estimate information symbols carried by a signal received originating from means of sending over the propagation channel, by applying to said signal a processing taking into account a predetermined maximum number of propagation paths, said propagation paths taken into account being chosen according to a criterion selected from several criteria, and in which said criterion is selected as a function of the measured data relating to the energy distribution in the propagation profile.

Each criterion for choosing the paths to be taken into account corresponds to a selection strategy, and can be selected for example from a set comprising a first criterion according to which the predetermined maximum number of propagation paths of greatest energy on average are taken into account, and a second criterion according to which the predetermined maximum number of propagation paths of largest instantaneous energy are taken into account.

Preferably, the measured data relating to the energy distribution in the propagation profile comprise a measurement of energy dispersion for the propagation paths detected, which measurement may be performed on the basis of an estimation of a mean energy gap between the propagation paths detected.

The selection of the criterion as a function of the measured data relating to the energy distribution in the propagation profile can, for example, comprise a comparison of the measurement of energy dispersion for the propagation paths detected with a threshold.

In the preferred embodiment of the invention, this threshold is obtained in relation to a prior choice of a gap in performance between two strategies for choosing propagation paths taken into account in said processing according to respective criteria, on the basis of correspondences between an energy dispersion in a propagation profile and a gap in performance between two strategies for choosing propagation paths according to respective criteria, the correspondences being pre-established under various radio conditions.

The propagation paths can be obtained conventionally by the analysis of an impulse response of the relevant propagation channel. This response then makes it possible to obtain the delays and the amplitudes relating to each of these paths.

The invention moreover proposes a spread spectrum 30 digital radio communication receiver comprising means for determining a propagation profile of a propagation channel between sending means and the receiver, including at least one propagation path associated with a reception energy, means for measuring data relating to an energy distribution in the propagation profile, means for choosing a predetermined maximum number of propagation paths according to a criterion for choosing, means for estimating information symbols carried by a signal received originating from means of sending over the propagation channel, by applying to said signal a processing taking into account the paths chosen. The receiver furthermore comprises means for selecting a criterion for choosing from several criteria, designed to select a criterion for choosing as a function of the data measured relating to the energy distribution in the propagation profile.

The means for determining a propagation profile of a propagation channel between sending means and the receiver can comprise means for applying to the signal received a processing identifying, on the basis of an analysis of an impulse response of the propagation channel between the sending means and the receiver, a number of propagation paths detected and respective reception energies for these paths.

The receiver according to the invention can moreover be designed in such a way that the means for measuring data relating to an energy distribution in the propagation profile comprise means for measuring an energy dispersion for the propagation paths detected.

In this particular case, the means for selecting a criterion for choosing may be designed to perform a comparison of this measurement of energy dispersion with a threshold.

In accordance with the foregoing, in the preferred embodiment of the invention, the means for selecting a criterion for choosing from several criteria are designed to obtain said threshold in relation to a prior choice of a gap in performance between two strategies for choosing the propagation paths.

The receiver may comprise means for storing correspondences between an energy dispersion in a propagation profile and a gap in performance between two strategies for choosing propagation paths according to respective criteria, said correspondences being pre-established under various radio conditions. The means for selecting a criterion for choosing may then be designed to obtain the threshold on the basis of the correspondences stored in these memory means.

The invention finally proposes a computer programme, loadable into a memory associated with a processor, and comprising instructions for the implementation of a method as defined herein above during the execution of said programme by the processor, as well as a computer medium on which said programme is recorded.

DESCRIPTION OF PREFERRED EMBODIMENTS

Figure 1:
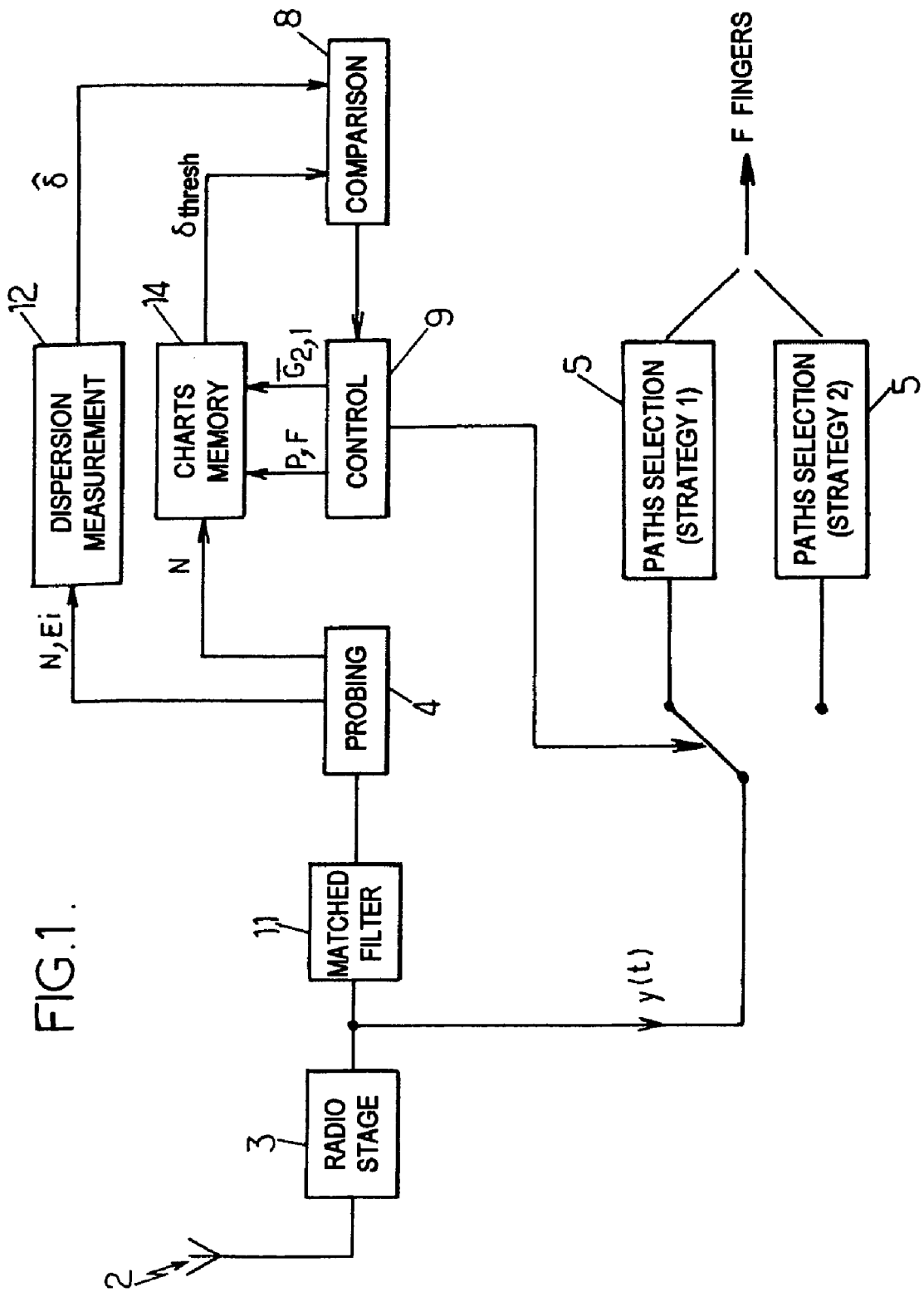
FIG. 1 is a schematic diagram of a receiver according to the invention.

FIG. 1 diagrammatically shows a radio receiver 1 able to implement the present invention. This receiver may be that of a base station or of a mobile terminal supporting spread spectrum CDMA radio communication technology such as UMTS technology.

The receiver 1 comprises means of reception, in particular one or more antennas 2 for receiving a signal transmitted by a sender or else a plurality of senders in the case where the receiver is embedded in a mobile terminal in a situation of macrodiversity or "soft handover", that is to say of simultaneous listening to redundant channels originating from different base stations. Considered hereinbelow is the nonrestrictive case of a signal transmitted by a single sender and received on a single antenna 2.

A radio stage 3 is conventionally located at the input of the receiver 1, in such a way as to perform a first processing of the signal received. For example, this processing can consist in amplifying the analogue signal received, in converting it into a digital signal and possibly in filtering it.

In the case of the UMTS system, phase-shift keying (PSK) is used. The signal comprises two distinct components, a real component and an imaginary component. The processing implemented by the radio stage 3 reconstructs a digital signal y(t), for example at a rate of one complex sample per chip.

As described above, the impulse response of the propagation channel can be estimated by means of a filter 11 matched to a pilot spreading code cP with which the sender modulates a known sequence of symbols. An analysis of the output of this matched filter is performed by a probing module 4. In a conventional manner, the latter does statistical calculations on the output of the matched filter 11—so as to determine delays $(\tau_i)_{0 \leq i \leq N-1}$ associated with the N paths or echoes observed, as well as the average reception energies $(E_i)_{0 \leq i \leq N-1}$ associated with these paths. It also estimates a level $N_0$ of the noise on the channel. Regular evaluation of these parameters is performed so as to have up-to-date knowledge of the propagation profile over the relevant channel.

The paths of greatest energy that are detected by the probing module 4 correspond to environment-dependent main paths. The path of greatest energy will correspond for example to a direct path between the sender and the receiver if they are in direct line of sight of one another. The other main echoes will schematically be those that give rise to the smallest number of reflections and diffractions between the sender and the receiver.

The energy $E_i$ associated with a path is the mathematical expectation of the modulus squared of the instantaneous amplitude $A_i(t)$ of reception on the corresponding propagation path.

The receiver has a limited number of "fingers" and will be able to allocate only a certain number F of them to a given user. As indicated previously, the receiver is therefore required to make a selection on the N paths observed on the profile of the user, according to various strategies. It is for example possible to choose to select the F paths of greatest energy on average, or else to select the F paths of largest instantaneous energy, according to the strategy presented by N. Kong et al. ("A Selection Combining Scheme for Rake Receivers", 1995 Fourth IEEE International Conference on Universal Personal Communications, 6-10 Nov. 1995 Page(s): 426-430).

It is moreover known to evaluate the performance of these strategies by calculating the mean bit error probability after combination. Letting $$\vec{x} = (x_0, \ldots x_{N-1})$$

denote the vector of the samples at the output of the matched filter, the selection operation can be written according to the relation: $(i_0, \ldots, i_{F-1}) = \text{Sel}(0, \ldots, N-1)$ where the selection operator is denoted Sel and $(i_0, \ldots, i_{F-1})$ are the indexes of the paths selected.

We determine the mean bit error probability P after MRC combination of the F paths selected according to the relation:

$$P(G) = \int_0^\infty Q(\sqrt{2Gs})p(s)ds \qquad (2)$$

$$\text{where } s = \sum_{k=0}^{F-1} |x_{i_k}|^2 \text{ and } Q(x) = \frac{1}{\sqrt{2\pi}} \int_x^\infty e^{-t^2/2} dt \text{ for } x \geq 0 \qquad (3)$$

An example of this determination of mean bit error probability is provided hereinbelow under the assumption that we choose to select the F paths of greatest energy on average.

In this particular case, we select the F paths having the highest values $E_i$. The mean bit error probability after MRC combination may then be written (see John G. Proakis, "Digital Communications", third edition, 1995, chapter 14):

$$P_1 = \frac{1}{2} \sum_{i=0}^{F-1} \prod_{\substack{j=0 \\ j \neq i}}^{F-1} \frac{\bar{\gamma}_i}{\bar{\gamma}_i - \bar{\gamma}_j} \left(1 - \sqrt{\frac{\bar{\gamma}_i}{1+\bar{\gamma}_i}}\right) \qquad (4)$$

where $(\gamma i)_{0 \leq i \leq F-1}$ designates the mean signal-to-noise ratio measured over the useful signal portions received on an antenna in the presence of fast fading possessing a Rayleigh probability density.

For the requirements of the modelling, a profile model in which the energy is distributed exponentially over the peaks of the profile corresponding to the paths will be adopted in what follows, so that we will put $E_i = \delta^i$ where the dispersion factor $\delta$ represents the mean gap between two paths ordered in the order of decreasing energies.

We have:

$$\bar{\gamma}i = \frac{E_b}{N_o} \times E_i$$

(G will designate, throughout what follows, the normalized signal-to-noise ratio $$\frac{E_b}{N_o})$$

and, by considering a profile model having an exponential distribution of energies over the paths:

$$P_1(G, F, \delta) = \frac{1}{2} \sum_{i=0}^{F-1} \prod_{\substack{j=0 \\ j \neq i}}^{F-1} \frac{1}{1-\delta^{j-i}} \left(1 - \frac{1}{\sqrt{1+\frac{1}{\delta^i \cdot G}}}\right) \qquad (5)$$

A step of normalizing the signal-to-noise ratios $\bar{\gamma}_i$ by taking account of the fact that F paths are selected from among N paths available in the profile leads to the expression:

$$P_1(G, N, F, \delta) = \frac{1}{2} \sum_{i=0}^{F-1} \frac{1}{\prod_{j \neq i}^{F-1}(1-\delta^{i-j})} \left(1 - \frac{1}{\sqrt{1+\frac{1}{\delta^i G} \frac{1-\delta^N}{1-\delta^F}}}\right) \qquad (6)$$

In a preferred embodiment of the invention, the performance of various selection strategies expressed in terms of mean bit error probability is associated with parameters relating to the energy distribution in the propagation profile (in the example presented the parameters G, N, F, δ). We are then in a position to compare the performance of these strategies.

For each relation $P_i(G,N,F,\delta)$ corresponding to a strategy for selecting the paths, a "manual" inversion can be performed, on the basis of calculated digital values, to obtain a relation $G_i(P,N,F,\delta)$. In the example illustrated, first and second relations $G_1(P,N,F,\delta)$ and $G_2(P,N,F,\delta)$ are thus obtained for the first and second strategies, respectively.

The numerical values of the gain afforded by the second strategy with respect to the first in the presence of N propagation paths in the profile, from among which F≦N are selected, for a profile on which a dispersion factor δ is plotted, and that the mean bit error probability after combination that one wishes to attain equals P, are obtained by taking: $G_{2,1}(P,N,F,\delta) = G_2(P,N,F,\delta) - G_1(P,N,F,\delta)$. It is thus possible to express a gain; or gap in performance between the two strategies as a function of the dispersion factor through the relation $G_{2,1} = G_2^{N,F,P}(\delta) - G_1^{N,F,P}(\delta)$. We thus obtain a set of correspondences between an energy dispersion and a gap in performance between two strategies (or criteria) for choosing the F propagation paths, as a function of the parameters P, N which characterize various radio conditions.

As indicated previously, another exemplary selection strategy is described by Kong et al., and leads to the following expression for the probability density p(s) in expression (2):

$$p_{G,N,F,\delta}(s) = \sum_{i_0=0}^{N-1} \sum_{\substack{i_1=0 \\ i_1 \neq i_0}}^{N-1} \cdots \sum_{\substack{i_{F-1}=0 \\ i_{F-1} \neq i_{F-2} \cdots i_{F-1} \neq i_0}}^{N-1} \cdots \quad (7)$$

$$G - 2u_1 \quad G - 2u_1 - \ldots - (F-1)u_{F-2}$$

$$\int_{u_1=0}^{G/2} \int_{u_2=0}^{3} \cdots \int_{u_{F-1}=0}^{F} \cdots$$

$$p_{i_0}(s - u_1 - 2u_2 \ldots - (F-1)u_{F-1}) p_{i_1}$$

$$(u_1 + \ldots + u_{F-1}) \ldots p_{i_{F-1}}(u_{F-1})$$

$$\left( \prod_{\substack{i=0 \\ i \neq i_{F-1},\ldots,i \neq i_0}}^{N-1} \int_0^{u_{F-1}} p_i(z) dz \right) du_1 \ldots du_{F-1}$$

with $$p_i(x) = \frac{1}{\delta^i} \frac{1-\delta^N}{1-\delta} \exp\left(-\frac{x}{\delta^i} \frac{1-\delta^N}{1-\delta}\right) \quad (8)$$

We then have, in accordance with relation (2):

$$P(G,N,F,\delta) = \int_0^\infty Q(\sqrt{2Gs}) p_{G,N,F,\delta}(s) ds \quad (9)$$

We then obtain G(P,N,F,δ), for example in the manner 15 described herein above, so as to then calculate the gain values $G_{2,1}$.

Figure 2:
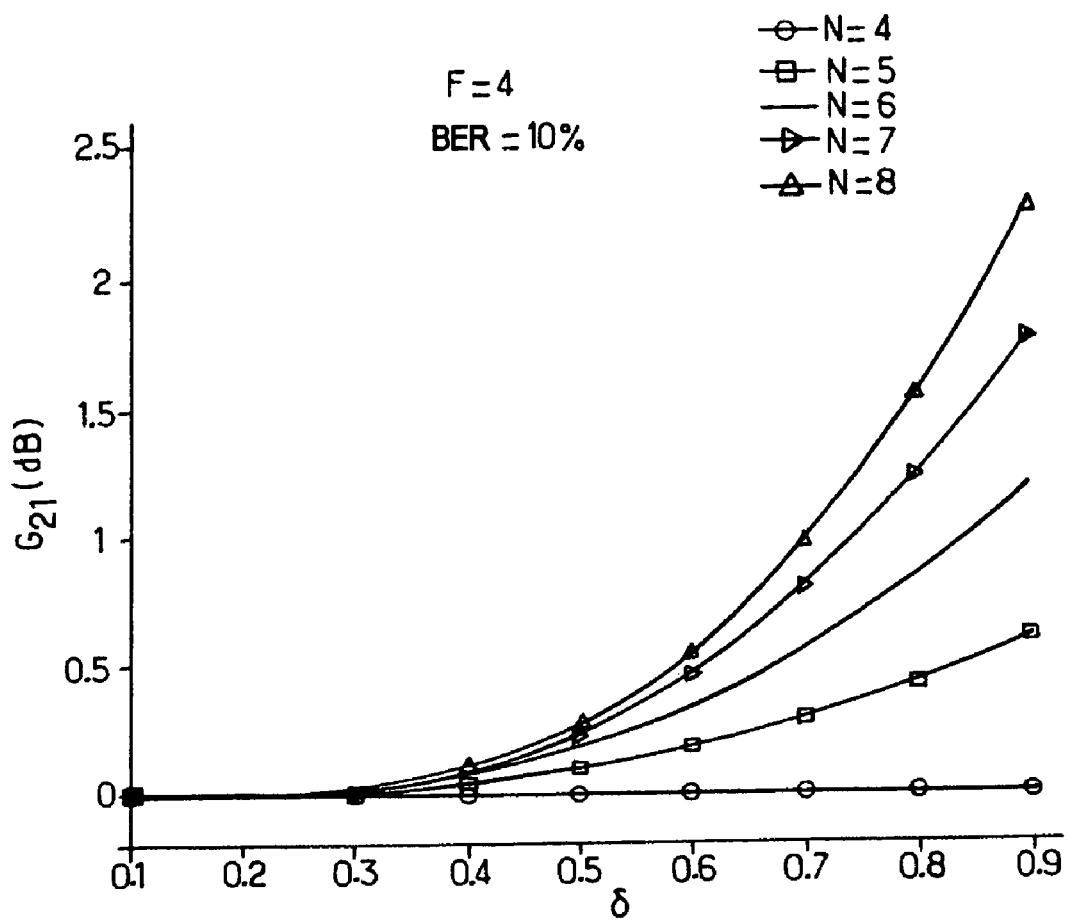
FIG. 2 is a graph showing examples of charts stored in the memory module of FIG. 1.

FIG. 2 provides an example of a net of charts representative of the evolution of the gain $G_{2,1}$ between the two strategies (selection of the paths of greatest energy on average and selection of the paths of largest instantaneous energy) as a function of the profile dispersion criterion δ for values of the parameters F=4, P=10% and N taking integer values between 4 and 8. The values corresponding to these charts are stored, for example in the form of tables, in a memory 14.

This memory module cooperates with the module 4 which tells it the value of the parameter N (number of paths observed on the profile) as well as with the module 9 which tells it the values of the parameters P (desired level of quality, expressed as an error probability level) and F (number of fingers available) for each user.

The module 4 moreover provides a dispersion measurement module 12 with the energies $E_i$ on the reception paths selected, estimated in accordance with the pilot channel of code $c^p$ and/or in accordance with the known pilot symbols inserted into the signal transmitted, as well as the number N of paths observed on the profile.

In the preferred embodiment of the invention, the module 12 estimates the dispersion parameter δ, for example in the least squares sense, this requiring a search for the roots of a polynomial in δ:

$$\hat{\delta} = \underset{\delta}{\text{Argmin}} \sum_{i=0}^{N-1} \left( \frac{E_i}{E_0} - \delta^i \right)^2 \quad (10)$$

More simply, the estimate $\hat{\delta}$ can be obtained by calculating the arithmetic mean of the ratios between energies of consecutive paths according to the relation:

$$\hat{\delta} = \frac{1}{N-1} \sum_{i=1}^{N-1} \frac{E_{i-1}}{E_i} \quad (11)$$

This estimate is provided to a module 8 which determines a criterion for selecting one or the other strategy for selecting the paths. In a preferred embodiment of the invention, the module 8 performs a comparison of the estimate $\hat{\delta}$ with a threshold provided by the module 14. This threshold reflects a compromise between the performance offered by one or the other of the two strategies (measured by the gain $\overline{G}_{2,1}$) and the complexity of the processing operations engendered by each of the strategies. In the example illustrated, the second strategy provides better performance, but at the price of greater complexity. Each chart of FIG. 2 illustrates a correspondence between the gain $G_{2,1}$ and the dispersion factor. The curves are increasing, this being explained by considering that as the dispersion decreases, the gain between the two strategies also decreases. Therefore, using a more complex strategy for a large dispersion affords only a slight gain relative to the use of a strategy that admittedly performs slightly less well, but is also much less expensive in software and hardware resources. To a chosen value of gain $\overline{G}_{2,1}$ there thus corresponds a dispersion threshold value $\delta_{thresh}$, under given conditions N, F and P. This value of gain $G_{2,1}$ may for example be transmitted by the control module 9 to the memory 14 so as to be consigned thereto.

In the example illustrated, the criterion applied by the module 8 consists in the estimate $\hat{\delta}$ being greater than or equal to the threshold $\delta_{thresh}$. If such is the case, the second strategy will be favoured, requiring the implementation of more complex processing operations which are however then justified in view of the resulting improvement in performance.

The module 8 provides the data of the choice to be made between the two strategies to the control module 9 which, in return, applies the choice made by selecting the module 5 for implementing the corresponding strategy for selecting the paths.

The invention claimed is:

1. A method of signal processing for a spread spectrum digital radio communication receiver, comprising the following steps:
   determining a propagation profile of a propagation channel between sending means and the receiver, including at least one propagation path associated with a reception energy;
   measuring data relating to an energy distribution in the propagation profile;
   estimating information symbols carried by a signal originating from said sending means and received over the propagation channel, by applying to said signal a processing taking into account a predetermined maximum number of propagation paths, said propagation paths taken into account being chosen according to a criterion selected from several criteria,
   in which said criterion is selected as a function of the measured data relating to the energy distribution in the propagation profile.

2. A method according to claim 1, in which the step of determining a propagation profile of a propagation channel between the sending means and the receiver comprises a processing applied to the signal received identifying, on the basis of an analysis of an impulse response of the propagation channel between the sending means and the receiver, a number of propagation paths detected and respective reception energies for these paths.

3. A method according to claim 1, in which said propagation paths taken into account are chosen according to a criterion selected from a set comprising a first criterion according to which the predetermined maximum number of propagation paths of greatest energy on average are taken into account, and a second criterion according to which the predetermined maximum number of propagation paths of largest instantaneous energy are taken into account.

4. A method according to claim 1, in which the measured data relating to the energy distribution in the propagation profile comprise a measurement of energy dispersion for the propagation paths detected.

5. A method according to claim 4, in which the selection of said criterion as a function of the measured data relating to the energy distribution in the propagation profile comprises a comparison of said measurement of energy dispersion for the propagation paths detected with a threshold.

6. A method according to claim 5, in which said threshold is obtained in relation to a prior choice of a gap in performance between two strategies for choosing propagation paths taken into account in said processing according to respective criteria.

7. A method according to claim 6, in which the obtaining of the threshold is done on the basis of correspondences between an energy dispersion in a propagation profile and a gap in performance between two strategies for choosing propagation paths according to respective criteria, the correspondences being preestablished under various radio conditions.

8. A method according to claim 4, in which the measurement of energy dispersion for the propagation paths detected comprises an estimation of a mean energy gap between the propagation paths detected.

9. A method according to claim 8, in which the mean energy gap between the propagation paths detected is estimated in the least squares sense.

10. A method according to claim 8, in which the mean energy gap between the propagation paths detected is estimated according to an arithmetic mean of ratios between the energies of consecutive paths from among the propagation paths detected.

11. A spread spectrum digital radio communication receiver comprising means for determining a propagation profile of a propagation channel between sending means and the receiver, including at least one propagation path associated with a reception energy, means for measuring data relating to an energy distribution in the propagation profile, means for choosing a predetermined maximum number of propagation paths according to a criterion for choosing, means for estimating information symbols carried by a signal originating from said sending means and received over the propagation channel, by applying to said signal a processing taking into account the paths chosen, said spread spectrum digital radio communication receiver furthermore comprising means for selecting said criterion for choosing from several criteria, said criterion for choosing being selected as a function of the data measured by the means relating to the energy distribution in the propagation profile.

12. A receiver according to claim 11, in which the means for determining a propagation profile of a propagation channel between sending means and the receiver comprise means for applying to the signal received a processing identifying, on the basis of an analysis of an impulse response of the propagation channel between the sending means and the receiver, a number of propagation paths detected and respective reception energies for these paths.

13. A receiver according to claim 11, in which the means for selecting a criterion for choosing from several criteria as a function of the measured data relating to the energy distribution in the propagation profile are designed to select a criterion for choosing from a set comprising a first criterion according to which the predetermined maximum number of propagation paths of greatest energy on average are taken into account, and a second criterion according to which the predetermined maximum number of propagation paths of largest instantaneous energy are taken into account.

14. A receiver according to claim 11, in which the means for measuring data relating to an energy distribution in the propagation profile comprise means for measuring an energy dispersion for the propagation paths detected.

15. A receiver according to claim 14, in which the means for selecting a criterion for choosing from several criteria as a function of the measured data relating to the energy distribution in the propagation profile are designed to make a selection which comprises a comparison of said measurement of energy dispersion for the propagation paths detected with a threshold.

16. A receiver according to claim 15, in which the means for selecting a criterion for choosing from several criteria as a function of the measured data relating to the energy distribution in the propagation profile are designed to obtain said threshold in relation to a prior choice of a gap in performance between two strategies for choosing the propagation paths.

17. A receiver according to claim 16, in which the means for selecting a criterion for choosing from several criteria as a function of the measured data relating to the energy distribution in the propagation profile comprise means for storing correspondences between an energy dispersion in a propagation profile and a gap in performance between two strategies for choosing propagation paths according to respective criteria, said correspondences being preestablished under various radio conditions.

18. A receiver according to claim 17, in which the means for selecting a criterion for choosing from several criteria as a function of the measured data relating to the energy distribution in the propagation profile are designed to obtain the threshold on the basis of the correspondences stored in the means for storing correspondences between an energy dispersion in a propagation profile and a gap in performance between two strategies for choosing the propagation paths according to respective criteria.

19. A receiver according to claim 14, in which the means for measuring an energy dispersion for the propagation paths detected are designed to estimate a mean energy gap between the propagation paths detected.

20. A receiver according to claim 19, in which the means for measuring an energy dispersion for the propagation paths detected are designed to estimate a mean energy gap between the propagation paths detected in the least squares sense.

21. A receiver according to claim 19, in which the means for measuring an energy dispersion for the propagation paths detected are designed to estimate a mean energy gap between the propagation paths detected according to an arithmetic mean of ratios between the energies of consecutive paths from among the propagation paths detected.

22. A computer program stored on a tangible medium, and comprising instructions for the implementation, during the execution of said program by a processor, of the followings steps:

determining a propagation profile of a propagation channel between sending means and the receiver, including at least one propagation path associated with a reception energy;

measuring data relating to an energy distribution in the propagation profile;

estimating information symbols carried by a signal originating from said sending means and received over the propagation channel, by applying to the said signal a processing taking into account a predetermined maximum number of propagation paths, the said propagation paths taken into account being chosen according to a criterion selected from several criteria, in which said criterion is selected as a function of the measured data relating to the energy distribution in the propagation profile.

23. A computer program according to claim 22, in which the step of determining a propagation profile of a propagation channel between sending means and the receiver comprises a processing applied to the signal received identifying, on the basis of an analysis of an impulse response of the propagation channel between the sending means and the receiver, a number of propagation paths detected and respective reception energies for these paths.

24. A computer program according to claim 22, in which said propagation paths taken into account are chosen according to a criterion selected from a set comprising a first criterion according to which the predetermined maximum number of propagation paths of greatest energy on average are taken into account, and a second criterion according to which the predetermined maximum number of propagation paths of largest instantaneous energy are taken into account.

25. A computer program according to claim 22, in which the measured data relating to the energy distribution in the propagation profile comprise a measurement of energy dispersion for the propagation paths detected.

26. A computer program according to claim 25, in which the selection of said criterion as a function of the measured data relating to the energy distribution in the propagation profile comprises a comparison of said measurement of energy dispersion for the propagation paths detected with a threshold.

27. A computer program according to claim 26, in which said threshold is obtained in relation to a prior choice of a gap in performance between two strategies for choosing propagation paths taken into account in said processing according to respective criteria.

28. A computer program according to claim 27, in which the obtaining of the threshold is done on the basis of correspondences between an energy dispersion in a propagation profile and a gap in performance between two strategies for choosing propagation paths according to respective criteria, the correspondences being preestablished under various radio conditions.

29. A computer program according to claim 25, in which the measurement of energy dispersion for the propagation paths detected comprises an estimation of a mean energy gap between the propagation paths detected.

30. A computer program according to claim 29, in which the mean energy gap between the propagation paths detected is estimated in the least squares sense.

31. A computer program according to claim 29, in which the mean energy gap between the propagation paths detected is estimated according to an arithmetic mean of ratios between the energies of consecutive paths from among the propagation paths detected.

32. A computer medium in which is recorded a program comprising instructions for the implementation of the followings steps, when executed by a processor:

determining a propagation profile of a propagation channel between sending means and the receiver, including at least one propagation path associated with a reception energy;

measuring data relating to an energy distribution in the propagation profile;

estimating information symbols carried by a signal received originating from said sending means and received over the propagation channel, by applying to the said signal a processing taking into account a predetermined maximum number of propagation paths, the said propagation paths taken into account being chosen according to a criterion selected from several criteria, said criterion being selected as a function of the measured data relating to the energy distribution in the propagation profile.

* * * * *

UNITED STATES PATENT AND TRADEMARK OFFICE
CERTIFICATE OF CORRECTION

PATENT NO.      : 7,613,230 B2                                          Page 1 of 1
APPLICATION NO. : 10/807664
DATED           : November 3, 2009
INVENTOR(S)     : Jard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1409 days.

Signed and Sealed this

Nineteenth Day of October, 2010

David J. Kappos
*Director of the United States Patent and Trademark Office*